3,299,156
DEHYDROCYCLIZATION CATALYST AND PROCESS

Jimmy Dwayne Ashley and Theodore August Swenson, Jr., Lake Jackson, Tex., assignors to The Dow Chemical Company, Midland, Mich., a corporation of Delaware
No Drawing. Filed June 21, 1963, Ser. No. 289,710
8 Claims. (Cl. 260—673.5)

This invention relates to the catalytic preparation of aromatic compounds from aliphatic hydrocarbon feed streams. More particularly, the present invention relates to an improved catalyst composition and to the use of this catalyst composition in a process for the conversion of non-aromatic $C_6$ and $C_7$ aliphatic hydrocarbons to benzene and toluene.

Numerous reforming catalysts are known. Such catalysts are usually employed in the petroleum industry to improve the octane number of gasoline fractions by increasing the amount of aromatic compounds in the gasoline mixtures. For example, molybdenum oxide supported on alumina has been used to convert methylcyclohexane to toluene. Reforming catalysts (such as chromia or alumina) which contain minor amounts of alkali metal oxides to inhibit carbon formation and varying amounts of promoters such as oxides of boron and the rare earth metals are also known. Although the cyclization of $C_6$-$C_7$ alkanes to cyclohexane and methylcyclohexane is generally more difficult to accomplish than the dehydrogenation of cyclohexane or methylcyclohexane, coke and other by-product formation during any dehydrogenation-cyclization process presents a continuing problem. Moreover, the space velocities which are employed using the known reforming catalysts are rather low and generally range from 0.1 to 1.0 volume of liquid hydrocarbon feed per hour per volume of catalyst.

It is an object of the present invention to provide a new catalyst composition which permits the use of higher space velocities than could previously be employed in dehydrocyclizing processes. A further object of the invention is to provide a process and catalyst which will give high yields of aromatic products from hydrocarbon feed streams with the formation of only minor amounts of by-products.

These and other objects may be accomplished by incorporating small amounts of both cerium and nickel (initially present in the form of cerium oxide and nickel oxide) into a chromia-alumina catalyst which contains a minor amount of potassium oxide. The resulting catalyst composition has particularly advantageous properties when employed to dehydrogenate and/or cyclize a $C_6$-$C_7$ hydrocarbon feed to benzene and toluene. The process and catalyst composition are especially effective when employed with pressures of 25 p.s.i.g. and above. Ordinarily, a pressure of from 40 p.s.i.g. to 1000 p.s.i.g. is sufficient, with pressures of from 50 p.s.i.g. to 100 p.s.i.g. preferred.

The catalyst composition is prepared by impregnating an activated alumina support (such as Alcoa grade F–110) with an aqueous solution containing chromium trioxide (chromic acid) and compounds of nickel and cerium (such as nickel nitrate and cerium nitrate). The impregnated material is then dried and further treated with a solution containing a potassium compound (such as KOH, $KNO_3$, etc.). The catalyst is then dried and calcined in order to form the oxides of the metals on the catalytic surface. After cooling to room temperature, the catalyst is ready for use. Reduction of the oxides to the metals occurs during use although this may be effected by a heat pre-treatment in inert atmosphere prior to use. The cooled catalyst may be stored for an indefinite period in the calcined form. It is to be understood, however, that in actual use, the cerium oxide and nickel oxide are reduced to the metal. This may be done either prior to use (by a reducing stream of hydrogen, for example) or during the dehydrogenation process (by the reducing effect of the hydrocarbon feed stream and hydrogen). For storage and shipment purposes, it is preferable to keep the catalyst in the oxidized form.

Typical catalysts prepared according to the foregoing method have the following range of compositions (all percentages based on the total weight of the catalyst plus support).

| Material: | Percent (by weight) |
|---|---|
| Alumina (support) | 72.0–93.0 |
| Potassium oxide | 0.5–2.0 |
| Chromium | 4.0–20.0 |
| Nickel | 0.25–3.0 |
| Cerium | 0.25–3.0 |

A preferred catalyst contains 85.5 percent alumina, 1.5 percent potassium oxide, 12.0 percent chromium and 0.5 percent each of nickel and cerium metals. The amounts of chromium, nickel and cerium are based upon the weight percent of metal in the catalyst, although these elements are actually present in the catalyst composition in the form of their oxides when the catalyst is first prepared. It has been found that this catalyst composition, although operable at lower pressures, shows a synergistic effect only when the pressure on the system is at least 25 p.s.i.g. The use of both cerium and nickel in combination with the other catalyst substituents gives superior results when compared with other catalysts which contain either cerium or nickel alone. These effects are especially pronounced at higher pressures. In addition, the use of pressure is desirable in a commercial process because the catalyst efficiency is greater at higher pressure (i.e., more product is produced per unit volume of catalyst used). Amounts of nickel and cerium (percent by weight of metal based upon the total weight of catalyst) as low as 0.25 percent may be employed, with maximum effective amounts of up to 3.0 percent of each metal. It is preferable that the amounts of nickel and cerium in the catalyst be approximately equal.

In a specific embodiment of the process of the invention, a mixture of non-aromatic $C_6$-$C_7$ hydrocarbons (predominantly hexanes and heptanes including both cyclic and acyclic $C_6$-$C_7$ compounds as well as $C_6$-$C_7$ hydrocarbons containing olefinic unsaturation such as cyclohexadiene, hexenes, cycloheptenes, cycloheptadienes, heptadienes and heptenes) is passed through the catalyst bed at a relatively high (greater than 4) liquid hourly space velocity (LHSV). Although aromatic compounds may be mixed with the non-aromatic $C_6$-$C_7$ feed, it is the non-aromatic portion that reacts in the process. The space velocity may be from 4 to 10 volumes of liquid per hour per volume of catalyst and is preferably from 6 to 8 volumes of liquid $C_6$–$C_7$ hydrocarbon feed per hour per volume of catalyst. The $C_6$–$C_7$ non-aromatic hydrocarbon feed is generally vaporized prior to the dehydrocyclization reaction. The reaction can be carried out at temperatures of from about 525° to about 600° C. In order to obtain the full benefit of the catalyst composition, the reaction is carried out with pressures of at least 25 p.s.i.g. When the temperature of the catalyst bed is from 525° to 600° C., pressures of from 40 p.s.i.g. to 1000 p.s.i.g. may be employed with $C_6$–$C_7$ hydrocarbon LHSV's of from 4 to 10. The dehydrogenation-dehydrocyclization reaction is preferably carried out at temperatures of from 540° to 580° C. under a pressure of from 50 to 100 p.s.i.g. with LHSV's of from 6 to 8.

The following examples are submitted for the purpose of illustration only and are not to be construed as limiting the scope of the invention in any way.

EXAMPLE I

The catalyst, prepared from calcined gamma alumina (Alcoa F–110 alumina calcined for 3 hours at 750° C.) had a surface area of 84 square inches per gram, a pore radius of $7.9 \times 10^{-3}$ microns and a pore volume of 0.329 cubic centimeter per gram. The catalyst composition was as follows (weight percentages): 12 percent chromium (deposited as the oxide), 1 percent each of nickel and cerium (both deposited as the oxide) and the remainder alumina. The catalyst was prepared by impregnating ⅛ inch diameter spheres of alumina with an aqueous solution containing chromic acid and the nitrates of nickel and cerium. The impregnated alumina was then dried for a period of 4–5 hours at a temperature of 100°–110° C. After drying, the mixture was further impregnated with a 2-normal solution of KOH, dried at a temperature of 100° to 110° C. and then calcined for 15–20 hours at 600° C. in nitrogen to form the metal oxides.

The catalyst was placed in a tubular reactor (a stainless steel tube with a capacity of 3 milliliters) and heated to a temperature of 556° C. A hydrocarbon feed stream composed of 45 percent by weight non-aromatic $C_6$ hydrocarbons (mostly hexanes and cyclohexane) and 55 percent by weight of non-aromatic $C_7$ hydrocarbons (n-heptane and methylcyclohexane) was mixed with hydrogen gas in a mole ratio of 4 moles of hydrogen per mole of hydrocarbon. Fifty percent by weight of the hydrocarbon feed was composed of cyclic hydrocarbons. The mixture was preheated to 85°–90° C. in a preheater zone and the resulting vapors were sent to the reactor. The reaction was run under a pressure of 60 p.s.i.g. with a liquid hourly space velocity of 6 volumes of liquid hydrocarbon feed per hour per volume of catalyst. The yield of aromatic compounds obtained was 83 percent of theory, based upon a conversion of 50 percent by weight of the hydrocarbon feed.

In another experiment, the same reaction was carried out under exactly the same conditions using the same feed mixture, but employing a catalyst which contained neither nickel nor cerium. The yield was substantially the same, but the conversion was only 35 percent based upon the weight of the hydrocarbon feed. The results are summarized in Table 1.

Table 1

| Product Mixture (Percent by Weight of Total) | Ce-Ni Catalyst Percent by Weight of Total Product | Without Ce-Ni Percent by Weight of Total Product |
|---|---|---|
| Benzene | 13.4 | 9.7 |
| Toluene | 28.1 | 19.8 |

EXAMPLES II–XIII

Using a catalyst prepared as in Example I, all containing 1.5 percent of $K_2O$ and 12 percent of Cr but with varying amounts of nickel and cerium (deposited on the gamma-alumina support as oxides), several experiments were carried out using a hydrocarbon feed which was composed of 97 percent by weight of normal-hexane. The remainder of the feed (3 percent) was composed of methylcyclopentane and 3-methylpentane. The reaction conditions and results are recorded in Table 2.

Table 2

| Example Number | Catalyst Composition (Percent by Weight; γ-Alumina Support) | | Reaction Conditions | | LHSV | Yield of Benzene (Percent of Theory Based on the Amount of n-$C_6$ Feed Converted) |
|---|---|---|---|---|---|---|
| | Ni | Ce | Temp. (° C.) | Pressure (p.s.i.g.) | | |
| II | 1.0 | 1.0 | 560 | 53 | 6 | 72.2 |
| III | | | 560 | 55 | 6 | 61.4 |
| IV | 1.0 | | 556 | 60 | 6 | 62.9 |
| V | | 1.0 | 556 | 60 | 6 | 67.4 |
| VI | 2.0 | | 575 | 60 | 8 | 43.0 |
| VII | | 2.0 | 575 | 60 | 8 | 56.2 |
| VIII | 1.0 | 1.0 | 574 | 60 | 8 | 73.0 |
| IX | 0.5 | 0.5 | 575 | 60 | 8 | 79.6 |
| X | | | 556 | 60 | 8 | 60.4 |
| XI | 0.5 | 0.5 | 557 | 60 | 8 | 78.9 |
| XII | 1.0 | | 574 | 60 | 8 | 59.2 |
| XIII | | 1.0 | 574 | 60 | 8 | 60.8 |

A comparison of Examples VI, VII and VIII indicates that the use of both cerium and nickel produces a non-additive effect when compared with the use of either cerium or nickel alone. Moreover, this effect (as measured by the yields in Table 2) is somewhat greater at lower concentrations, as shown by Example IX.

We claim as our invention:

1. A process for the preparation of aromatic hydrocarbons which comprises contacting a non-aromatic hydrocarbon feed of from 6 to 7 carbon atoms with a catalyst containing a mixture of both cerium and nickel on an alumina support.

2. A process for the preparation of benzene and toluene which comprises contacting a non-aromatic mixture of hydrocarbon compounds containing from 6 to 7 carbon atoms with a catalyst containing from 4 to 20 percent chromium, from 0.25 to 3.0 percent of nickel and from 0.25 to 3.0 percent of cerium on a gamma-alumina support at a temperature of from 525° to 600° C. and a pressure of at least 25 p.s.i.g.

3. The process of claim 2 wherein the non-aromatic hydrocarbon mixture is in the vapor state when contacted with the catalyst.

4. The process of claim 2 wherein the non-aromatic hydrocarbon mixture is contacted with the catalyst at a liquid hourly space velocity of at least four volumes of liquid hydrocarbon feed per hour per volume of catalyst.

5. A dehydrogenation-cyclization catalyst which contains a mixture of cerium and nickel oxides each in approximately equal amounts in a range of from about .25 to about 3% by weight, based on the total catalyst weight on a gamma-alumina support.

6. The catalyst of claim 5 in reduced form.

7. A catalyst composed of the oxides of cerium, nickel, chromium and potassium on a gamma-alumina support in which the amount of cerium is from 0.25 to 3.0 percent, the amount of nickel is from 0.25 to 3.0 percent, the amount of chromium is from 4 to 2.0 percent and the amount of potassium oxide is from 0.5 to 2.0 percent, wherein all of the percentages are by weight based upon the total weight of the supported mixture.

8. The catalyst of claim 7 in reduced form.

References Cited by the Examiner

UNITED STATES PATENTS

| 2,785,209 | 3/1957 | Schmetterling | 260—673.5 |
| 2,971,035 | 2/1961 | Stringer et al. | 260—673.5 |
| 3,151,113 | 7/1964 | Advani et al. | 252—462 |
| 3,179,602 | 4/1965 | Gremillion | 260—673.5 |

ALPHONSO D. SULLIVAN, *Primary Examiner.*